(12) United States Patent
Ebert

(10) Patent No.: US 7,941,751 B2
(45) Date of Patent: May 10, 2011

(54) GENERATION AND IMPLEMENTATION OF DYNAMIC SURVEYS

(75) Inventor: Peter Ebert, Menlo Park, CA (US)

(73) Assignee: SAP AG, Walldorf (DE)

( * ) Notice: Subject to any disclaimer, the term of this patent is extended or adjusted under 35 U.S.C. 154(b) by 929 days.

(21) Appl. No.: 11/496,094

(22) Filed: Jul. 31, 2006

(65) Prior Publication Data
US 2008/0028313 A1   Jan. 31, 2008

(51) Int. Cl.
*G06F 3/00*    (2006.01)
*G06F 17/30*   (2006.01)
*G06F 3/048*   (2006.01)

(52) U.S. Cl. ............... 715/730; 715/731; 715/780

(58) Field of Classification Search .......... 715/730, 715/731, 780; 705/10
See application file for complete search history.

(56) References Cited

U.S. PATENT DOCUMENTS

| | | | |
|---|---|---|---|
| 5,537,618 A | 7/1996 | Boulton et al. | |
| 5,734,890 A | 3/1998 | Case et al. | |
| 5,764,923 A * | 6/1998 | Tallman et al. | 705/3 |
| 5,842,221 A * | 11/1998 | Schmonsees | 1/1 |
| 5,893,098 A * | 4/1999 | Peters et al. | 707/10 |
| 6,134,531 A | 10/2000 | Trewitt et al. | |
| 6,189,029 B1 | 2/2001 | Fuerst | |
| 6,260,064 B1 | 7/2001 | Kurzrok | |
| 6,311,190 B1 | 10/2001 | Bayer et al. | |
| 6,421,724 B1 | 7/2002 | Nickerson et al. | |
| 6,477,504 B1 | 11/2002 | Hamlin et al. | |
| 6,581,071 B1 | 6/2003 | Gustman et al. | |
| 6,606,581 B1 | 8/2003 | Nickerson et al. | |
| 6,618,746 B2 | 9/2003 | Desai et al. | |
| 6,874,125 B1 | 3/2005 | Carroll et al. | |
| 6,963,898 B2 | 11/2005 | Yoshimine et al. | |
| 7,313,621 B2 | 12/2007 | Gudorf et al. | |
| 7,428,505 B1 | 9/2008 | Levy et al. | |
| 7,433,832 B1 | 10/2008 | Bezos et al. | |
| 7,451,094 B2 * | 11/2008 | Royall et al. | 705/1 |
| 7,478,121 B1 | 1/2009 | Nickerson et al. | |
| 7,487,121 B2 | 2/2009 | Swarna et al. | |
| 7,519,562 B1 | 4/2009 | Mey et al. | |
| 7,565,615 B2 | 7/2009 | Ebert | |
| 2001/0032107 A1 | 10/2001 | Iwata et al. | |
| 2001/0034639 A1 * | 10/2001 | Jacoby et al. | 705/10 |

(Continued)

OTHER PUBLICATIONS

Jenkins, J. A., "Creating a Web-Based Survey Part-I: Dynamic Questions", http://www.zend.com/zend/tut/tutorial-jenkins.php, (Jan. 9, 2002), 8 pgs.

(Continued)

*Primary Examiner* — Stephen S Hong
*Assistant Examiner* — Marshon Robinson
(74) *Attorney, Agent, or Firm* — Brake Hughes Bellermann LLP

(57) ABSTRACT

Techniques are described for generating and implementing dynamic surveys, in which a subsequent query is presented based at least in part on a selected response option of a previous query. For example, a system may include presentation logic configured to display a plurality of queries, each query being associated with a plurality of response options. Sequence logic of the system may be configured to display a graphical sequence controller in association with each of the plurality of response options, and to receive a graphical manipulation of the graphical sequence controllers by which a sequence is designated for presenting a subsequent query based on a selected response option of a previous query. Thus, during implementation of the resulting dynamic survey, the subsequent query may be presented based on the selected response option.

16 Claims, 10 Drawing Sheets

U.S. PATENT DOCUMENTS

| | | | |
|---|---|---|---|
| 2002/0016848 A1 | 2/2002 | Yoshimine et al. | |
| 2002/0120491 A1* | 8/2002 | Nelson | 705/10 |
| 2002/0128898 A1* | 9/2002 | Smith et al. | 705/10 |
| 2002/0129052 A1 | 9/2002 | Glazer et al. | |
| 2002/0138284 A1* | 9/2002 | DeCotiis et al. | 705/1 |
| 2002/0169782 A1 | 11/2002 | Lehmann et al. | |
| 2003/0001887 A1 | 1/2003 | Smith | |
| 2003/0005465 A1 | 1/2003 | Connelly | |
| 2003/0014400 A1 | 1/2003 | Siegel | |
| 2003/0050994 A1 | 3/2003 | Pollack | |
| 2003/0088452 A1 | 5/2003 | Kelly | |
| 2003/0152904 A1 | 8/2003 | Doty, Jr. | |
| 2003/0233269 A1* | 12/2003 | Griffin et al. | 705/10 |
| 2004/0019688 A1 | 1/2004 | Nickerson et al. | |
| 2004/0034610 A1 | 2/2004 | De Lacharriere et al. | |
| 2004/0044559 A1* | 3/2004 | Malik et al. | 705/10 |
| 2004/0049534 A1 | 3/2004 | Nickerson et al. | |
| 2004/0061720 A1 | 4/2004 | Weber | |
| 2004/0075681 A1* | 4/2004 | Anati | 345/738 |
| 2004/0128183 A1* | 7/2004 | Challey et al. | 705/10 |
| 2004/0172323 A1 | 9/2004 | Stamm | |
| 2004/0176992 A1 | 9/2004 | Santos et al. | |
| 2004/0189716 A1 | 9/2004 | Paoli et al. | |
| 2004/0260781 A1 | 12/2004 | Shostack et al. | |
| 2004/0264447 A1 | 12/2004 | McEvilly et al. | |
| 2005/0114366 A1 | 5/2005 | Mathai et al. | |
| 2005/0131752 A1* | 6/2005 | Gracie et al. | 705/10 |
| 2005/0154557 A1 | 7/2005 | Ebert | |
| 2005/0192853 A1 | 9/2005 | Ebert et al. | |
| 2005/0192854 A1 | 9/2005 | Ebert et al. | |
| 2005/0193333 A1 | 9/2005 | Ebert | |
| 2005/0283468 A1 | 12/2005 | Kamvar et al. | |
| 2006/0075088 A1 | 4/2006 | Guo et al. | |
| 2006/0107195 A1* | 5/2006 | Ramaswamy et al. | 715/500.1 |
| 2007/0288246 A1 | 12/2007 | Ebert | |

OTHER PUBLICATIONS

3M, "Post-it® Software Notes: Overview", undated materials, copyright 2003, retrieved from the Internet on May 7, 2004, http://www.3m.com/market/office/postit/com_prod/psnotes/index.html, 3 pages.

Eight Days, Inc., "Hot or Not", undated materials, copyright 2000-2004, retrieved from the Internet on May 7, 2004, http://www.hotornot.com/, 4 pages.

Gadwin Systems, Inc., "Diagram Studio", retrieved from the Internet on Mar. 26, 2010, http://www.gadwin.com/ds/, 2 pages.

Gadwin Systems, Inc., "Gadwin PrintScreen", retrieved from the Internet on Mar. 26, 2010, http://www.gadwin.com/printscreen/, 2 pages.

Microsoft Corporation, "The Customer Experience Improvement Program: Continuing Software Improvement at Microsoft", undated materials, copyright 2000, retrieved from the Internet Jan. 9, 2004, http://www.microsoft.com/products/ceip/english/default.html, 3 pages.

Opinionlab, Inc., "OpinionLab OnlineOpinion Web User Feedback System: A Proven System to Monitor and Improve the Online User Experience Based on Continuously Listening to Visitors Across Your Entire Website", undated materials, copyright 2004, retrieved from the Internet Jan. 9, 2004, http://www.opinionlab.com/, 1 page.

Opinionlab, Inc., "OpinionLab OnlineOpinion Web User Feedback System: More About OnlineOpinion", undated materials, copyright 2004, retrieved from the Internet Jan. 7, 2004, http://www.opinionlab.com/more_about_00.asp, 2 pages.

Opinionlab, Inc., "The OnlineOpinion System: Different From Other Feedback Techniques", 2002, 3 pages.

"Amazon.com New Releases-Books", Amazon.com, retrieved on Sep. 10, 2010 from http://web.archive.org/web/20031211 072245/www.amazon.com/execlobidos/tg/new-for-you/new-releases-books/-/5/ref=pd_nfy-fjw_n1/, 2003, 3 pages.

Non-Final Office Action for U.S. Appl. No. 11/449,315, mailed Sep. 21, 2010, 27 pages.

* cited by examiner

200

File Edit View  Favorites  Tools  Help http://localhost

| 118a Static Mode | 118b Design Mode | 118c Test Mode |

1. How did you like the event overall?  ← 202
Not much —O——O——O——O——O— Very
at all     1    2    3    4    5   much  ← 204

2. Please let us know in more detail why you did not like the event so that we might improve it in the future?  ← 206
← 208

3. What did you like best?  ← 210
← 212

4. Which session did you attend?  ← 214
○ CRM
○ SCM  ← 216
○ PLM

Submit  ← 218

```
                                                    ┌─400
┌──────────────────────────────────────────────────────┐
│                                              _ ☐ X   │
├──────────────────────────────────────────────────────┤
│ File  Edit  View   Favorites   Tools  Help           │
│ ⇦·⇨·⊖ ⊗⋒  [http://localhost                    ▼]    │
│                                                       │
│        ┌─────────┐  ┌─────────┐  ┌─ ─ ─ ─ ─┐         │
│        │118a Dynamic│ │118b Design│ │118c Test │        │
│        │  Mode    │  │  Mode    │  │  Mode    │        │
│        └─────────┘  └─────────┘  └─ ─ ─ ─ ─┘         │
```

1. How did you like the CRM session overall? ← 402

Not much ─○────○────○────○────○─ Very
  at all   1    2    3    4    5   much ← 404
         [2:4][2:4][2:4][2:4][2:4]
                                      ↖
                                       422

2. How did you like the SCM session overall? ← 406

Not much ─○────○────○────○────○─ Very
  at all   1    2    3    4    5   much ← 408
         [2:4][2:4][2:4][2:4][2:4]
                                      ↖
                                       424

3. How did you like the PLM session overall? ← 410

Not much ─○────○────○────○────○─ Very
  at all   1    2    3    4    5   much ← 412
         [2:4][2:4][2:4][2:4][2:4]
                                      ↖
                                       426

428 4. What is your role in your organization? ← 414
   [2:5]  ○ Manager
   [2:5]  ○ Sales Expert ← 416
   [2:5]  ○ Technical Expert 5. Please input any other feedback you may have? ← 418

┌──────────────────────────────┐ △
   │                              │ ═ ← 420
   │                              │ ▽     ─218
   └──────────────────────────────┘   ( Submit )

GENERATION AND IMPLEMENTATION OF DYNAMIC SURVEYS

TECHNICAL FIELD

This description relates to dynamic surveys.

BACKGROUND

Collection and analysis of data associated with actions and/or opinions of users are widely used, for example, to facilitate improvement of processes, products, or services. For example, a provider of a service may wish to know the experiences of users (e.g., purchasers) of the service, whether the experiences are positive or negative.

For example, known computer techniques allow for convenient ways to generate and distribute feedback forms, or surveys, to collect such information from users. Moreover, such techniques may be convenient for the users who provide the desired feedback, and, as such, may improve a likelihood that the users will, in fact, provide such feedback. For example, users may receive such feedback forms or other surveys by way of e-mail, or by visiting a website.

Such surveys may generally be classified either as static or dynamic. Static surveys generally progress in a linear fashion, e.g., may progress consecutively through an ordered list of questions and responses. Dynamic surveys, on the other hand, may determine a subsequent question to present, based on, for example, an answer to a previous question. Accordingly, dynamic surveys may be used to provide a more individualized, interactive, and user-friendly experience for the survey respondent. Consequently, a designer or manager of a dynamic survey may obtain more, and more meaningful, responses.

Dynamic surveys, however, are generally more difficult to construct than static surveys. For example, some knowledge of computer programming may be required, which may not be possessed by all survey designers. Moreover, even if a dynamic survey is designed and implemented, it may be difficult for the designer to test the resulting dynamic survey, in order to ensure that a desired sequence of questions was achieved.

SUMMARY

According to on general aspect, a computer program product, tangibly embodied on computer-readable media, is configured to cause a data processing apparatus to display a first query, a second query, and a third query, the first query being associated with a first response option and a second response option, and is further configured to cause the data processing apparatus to display a first graphical sequence controller associated with the first response option and a second graphical sequence controller associated with the second response option. The computer program product is further configured to cause the data processing apparatus to receive a first designation of the first graphical sequence controller to provide the second query in response to selection of the first response option; receive a second designation of the second graphical sequence controller to provide the third query in response to selection of the second response option, and store the first designation and the second designation in association with an electronic survey that includes the first query, second query, and third query.

According to another general aspect, a system includes presentation logic configured to display a plurality of queries, each query being associated with a plurality of response options, and sequence logic configured to display a graphical sequence controller in association with each of the plurality of response options, and to receive a graphical manipulation of the graphical sequence controllers by which a sequence is designated for presenting a subsequent query based on a selected response option of a previous query.

According to another general aspect, a computer program product, tangibly embodied on computer-readable media, is configured to cause a data processing apparatus to provide a first query, second query, and third query, the first query having a first response option and a second response option, and display the first query, first response option, and second response option within a graphical user interface while concealing the second query and third query. The computer program product is further configured to cause the data processing apparatus to receive a selection of the first response option, determine a stored designation in which selection of the first response option indicates a providing of the second query, and display the second query within the graphical user interface, based on the stored designation.

The details of one or more implementations are set forth in the accompanying drawings and the description below. Other features will be apparent from the description and drawings, and from the claims.

BRIEF DESCRIPTION OF THE DRAWINGS

FIG. 2 is a screenshot, in a static design mode, of a first page of an example survey designed with the system of FIG. 1.

FIG. 3 is a screenshot, in a dynamic design mode, of the first page of the example survey of FIGS. 2 and 3.

FIG. 4 is a screenshot, in a dynamic design mode, of a second page of the example survey of FIGS. 2 and 3.

FIG. 9 is a screenshot of an implementation of a dynamic survey using the system of FIG. 7 and the example survey of FIG. 2.

DETAILED DESCRIPTION

Figure 1:
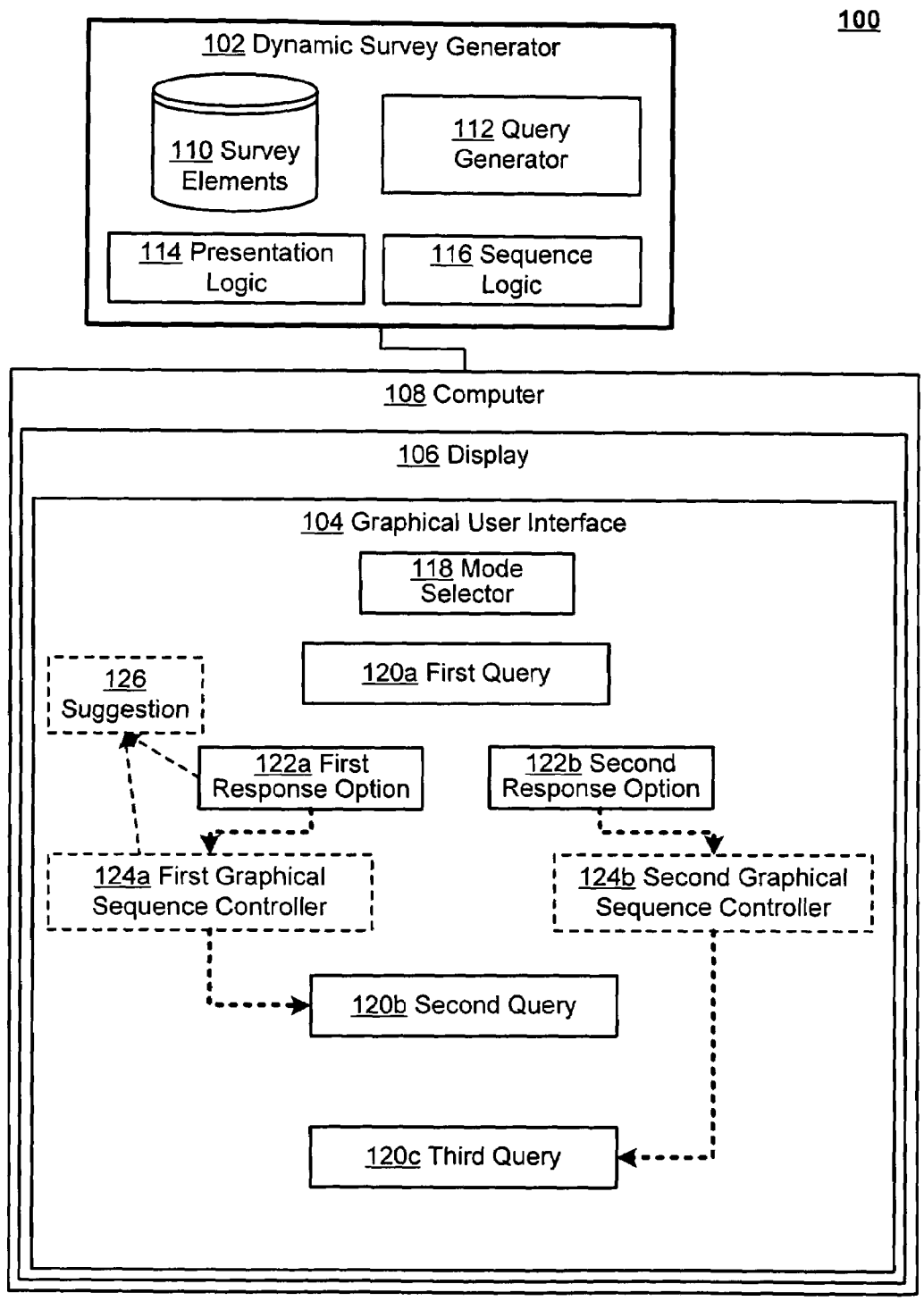
FIG. 1 is a block diagram of a system for the generation and implementation of dynamic surveys.

FIG. 1 is a block diagram of a system 100 for the generation and implementation of dynamic surveys. In the example of FIG. 1, a dynamic survey generator 102 is illustrated that is configured to provide for a straight-forward, convenient technique for designing and implementing dynamic surveys, without requiring programming knowledge on a part of the survey designer. More specifically, the dynamic survey generator 102, during a design of a dynamic survey, provides for graphical designation of a dynamic sequence of survey query/response pairs, in which presentation of a subsequent query depends at least in part on a received response to a previous or current query. In this way, a dynamic survey may be generated, and the benefits thereof may be obtained, including, for example, an individualized user (e.g., respondent) experience and improved value of survey results.

As shown, the dynamic survey generator 102 may be operated in conjunction with a graphical user interface (GUI) 104. The GUI 104 may include, for example, a browser or other software application that is configured to allow a user thereof to display and/or interact with various types of data. The GUI 104, e.g., browser, may be configured, for example, to obtain information from remote sources, e.g., server computers, using various protocols (e.g., hyptertext transfer protocol (HTTP)) and associated techniques, examples of which are described herein.

As should be apparent, the GUI 104 may be implemented on a conventional display 106. The display 106 may typically be operated in conjunction with a computer 108, which may represent, for example, a desktop or laptop computer, a personal digital assistant (PDA), a networked computer (e.g., networked on a local area network (LAN)), or virtually any type of data processing apparatus. As should also be apparent, the computer 108 may be associated with various types of storage techniques and/or computer-readable media, as well as with one or more processors for executing instructions stored thereon.

In FIG. 1, the dynamic survey generator 102 may include, or have access to, survey elements 110. The survey elements 110 generally may represent or include, for example, query/response pairs that may be, or have been, included in a survey that is to be distributed to a plurality of users. For example, the survey elements 110 may include query/response pairs and/or icons (e.g., selection buttons or check-boxes), content, or various data-entry fields. The survey elements 110 may be represented or constructed, for example, as objects or other software components, perhaps expressed in eXtensible Mark-up Language (XML) or other suitable language. Although illustrated for example as being a part of the dynamic survey generator 102, it should be understood that the survey elements 110 may be separate from the dynamic survey generator 102, and accessed remotely.

In FIG. 1, it is assumed that a survey designer, e.g., manager or administrator, has constructed and/or obtained access to a plurality of query/response pairs that are stored as/within the survey elements 110. Further, it is assumed that the survey designer has requested, and obtained, the display of a number of such query/response pairs on the GUI 104. For example, the survey designer may wish to conduct a survey, and may view the selected query/response pairs as a step in implementing the survey. An example system for conducting and managing such a survey is discussed below with respect to FIG. 7, but, generally speaking, example techniques for constructing or accessing query/response pairs for use in conducting surveys are known, and are not discussed in detail in this description.

Rather, examples of such techniques for constructing/accessing query/response pairs are assumed to be implemented by an element such as a query generator 112, further functions of which are described in more detail, below. The resulting query/response pairs may then be displayed on the GUI 104 using presentation logic 114, and, as described in detail below, a dynamic sequence of presentation of the selected query/response pairs may be received, recorded, and implemented using sequence logic 116.

For example, the GUI 104 may be operated in a first mode, e.g., a design mode (which may be selected using mode selector 118, such as a button or drop-down menu, and described in more detail, below). In such a design mode, the presentation logic 114 may display a first query 120*a*, a second query 120*b*, and a third query 120*c*. In FIG. 1, the first query 120*a* is shown as being associated with a first response option 122*a* and a second response option 122*b*. For example, the first query 120*a* may include a question such as "did you enjoy the event," so that the first response option 122*a* includes the option "yes" and the second response option 122*b* includes the option "no."

As should be apparent, it is often the case that a user's response may reduce or eliminate a need for a following question, or, conversely, may raise the need for a following question. In the example just given, if a user responds "yes," then it may be very useful to follow that response with a question (e.g., the second query 120*b*) such as "why did you enjoy the event?" On the other hand, if the user responds "no," then a subsequent question about enjoying the event would be meaningless and/or confusing. Instead, a more appropriate question (e.g., the third query 120*c*) may be included as "why didn't you enjoy the event?" It should be apparent, then, that including both the second query 120*b* and the third query 120*c* may be problematic in the above-described example scenario, since only one of these will be applicable for any given user.

Accordingly, the dynamic survey generator 102 (e.g., the presentation logic 114 and/or the sequence logic 116) may be configured to display a first graphical sequence controller 124*a* that allows the survey designer with the ability to provide a first designation to provide the second query 120*b* in response to a selection of the first response option 122*a*. The dynamic survey generator 102 is further configured to display a second graphical sequence controller 124*b* that allows the survey designer with the ability to provide a second designation to provide the third query 120*c* in response to a selection of the second response option 122*b*.

Upon a desired manipulation of the graphical sequence controllers 124*a*, 124*b*, the sequence logic 116 may store the first designation and second designation, e.g., within the survey elements 110. For example, the sequence logic 116 may store an XML component that includes the first query 120*a*, and that includes the first response option 122*a*, the second response option 122*b*, with the first designation and second designation, respectively. In this way, when such an XML component (e.g., survey element 110) is later presented to the user as part of the designed survey, then, for example, selection of the second response option 122*b* by the user will result in the display of the third query 120*c*, while skipping, hiding, or otherwise not displaying the second query 120*b*.

A number of different examples of the first graphical sequence controller 124*a* and the second graphical sequence controller 124*b* are provided herein. For example, as illustrated conceptually in FIG. 1 and as shown definitively in FIG. 5, the graphical sequence controllers 124*a*, 124*b* may include editable arrows or pointers, and the survey designer may, for example, simply use a mouse and cursor movement to direct a pointing end of the arrow/pointer(s) from a response option to a following query. In other example implementations, the graphical sequence controllers 124*a*, 124*b* may include editable and/or selectable, pop-up windows having a one-to-one relationship with the first response option 122*a* and the second response option 122*b*, and in which the survey designer may type in (or otherwise select or designate) a subsequent query to follow the associated response option. Other examples are discussed in more detail below, e.g., with respect to FIGS. 2-5.

As further illustrated in FIG. 1, the dynamic survey generator 102 may be configured to provide a suggestion 126 that may be associated, for example, either with the first response option 122*a* or the first graphical sequence controller 124*a*. For example, the survey designer may "roll over" or "hover over" the first response option 122*a* or the first graphical sequence controller 124*a* with a mouse cursor, and a further pop-up window may appear as the suggestion 126 in which the survey designer is provided with additional information about which subsequent queries might be designated. For example, the suggestion 126 may state that the survey designer should consider designating the second query 120*b* as following a selection of the first response option 122*a* by the user (respondent), or may point out that all relevant queries for the first response option 122*a* are included on a particular (e.g., third) page of the larger electronic survey. Conversely, the suggestion 126 may suggest avoiding the designation of the third query 120*c* as being inapplicable for following the first response option 122*a*. In this way, the survey designer may be provided with straightforward techniques for finding and designating subsequent queries for use in a dynamic survey being designed.

Thus, the dynamic survey generator 102 is configured to provide the presentation logic 114, which is configured to display a plurality of queries (e.g., the queries 120*a*, 120*b*, and 120*c*). At least some of the queries may be associated with a plurality of response options. For example, the response options may include options such as yes/no, true/false, multiple choice options (e.g., options (a)-(d)), or ratings options (e.g., rating an opinion on a scale from 1-5). The dynamic survey generator 102 also may include the sequence logic 116, which may be configured to display at least one graphical sequence controller (e.g., the graphical sequence controllers 124*a*, 124*b*) in association with each of the plurality of response options. The sequence logic 116 may thus receive a graphical manipulation of the graphical sequence controllers 124*a*, 124*b* by the survey designer, so as to receive designations for presenting a subsequent query based on a selected response option of a previous query.

Although the presentation logic 114 and the sequence logic 116 are illustrated as separate components, it should be understood that they, and all of the elements of the dynamic survey generator 102 (and other elements, not shown) may be implemented together or separately. Moreover, functions of the elements of the dynamic survey generator 102 may overlap, or be combined. For example, as referenced above, the designations of which query should follow which response option of a previous query may be stored within the survey elements 110 themselves, and the sequence logic 116 and/or the presentation logic 114 may simply follow these designations when retrieving the survey elements 110.

As referenced above, the dynamic survey generator 102 may be operated in a number of different modes, represented as being selectable by the mode selector 118. For example, a static design mode may be selected, in which little or none of the dynamic design elements (e.g., the graphical sequence controllers 124*a*, 124*b*) are used. In this example, the query generator 112 may be used to generate or otherwise provide a number of the survey elements 110, and the survey designer may simply construct a sequential, numbered order of queries (e.g., the first query 120*a*, the second query 120*b*, and the third query 120*c*), which may then be persisted as a survey and distributed to a number of users, for example, by any known electronic medium (e.g. e-mail, or Internet/Intranet). Of course, in this mode, the survey designer may edit queries, change a number or type of response options, or re-arrange an order of questions.

The survey designer may enter a dynamic design mode by selection of the mode selector 118. For example, in the static design mode just described, the survey designer may construct a number of queries to include in a survey. The queries may include all possible queries for the survey, even though it is recognized that some of the queries will be inapplicable to a given user, depending on the responses of the given user to previous queries (as in the "did you enjoy the event," "yes/no," example given above).

In the dynamic design mode, however, the survey designer may be presented with the graphical sequence controllers 124*a*, 124*b*. For example, after arranging the possible queries in a desired manner, the survey designer may request the graphical sequence controllers 124*a*, 124*b*, perhaps by selection of the mode selector 118 or other appropriate button/element of the GUI 104. The dynamic survey generator 102 may then present the graphical sequence controllers 124*a*, 124*b* as being aligned with each of the various response options, so that the survey designer may graphically control a sequence or flow of the queries, based at least in part on responses to previous queries.

When finished, or when desired, the survey designer may again select the mode selector 118, to switch into a test mode. In this test mode, the survey designer may be allowed to view the results of the dynamic design. For example, the presentation logic 114 and/or the sequence logic 116 may initially present the first query 120*a*, the first response option 122*a*, and the second response option 122*b*, while concealing the second query 120*b* (and associated response options, not shown in FIG. 1 for simplicity) and the third query 120*c* (also illustrated without its associated response options). Then, the survey designer may select the first response option 122*a*, and see that the second query 120*b* (but not the third query 120*c*) is subsequently presented, or may select the second response option 122*b* to see that the third query 120*c* (but not the second query 120*b*) is presented.

Of course, the example of FIG. 1 is simplified greatly for the sake of illustration, but it should be understood that a survey constructed in the manner of FIG. 1 may include a large number of questions, perhaps expressed on a plurality of screens/pages. Accordingly, a large number of possible sequences/flows may be possible within any given survey. Thus, the presentation logic 114 and/or the sequence logic 116 may include functionality used in the test mode in which all of the possible sequences/flows are "played" for the survey designer automatically.

For example, the dynamic survey generator 102, if instructed to "play" the survey in this manner, may first display the first query 120*a*, the first response option 122*a*, and the second response option 122*b* (while concealing, or otherwise indicating non-use of, the second query 120*b* and third query 120*c*). The dynamic survey generator 102 may then illustrate a selection of the first response option 122*a* (e.g., by automatically filling in a check-box associated with a "yes" answer), and a resulting display of the second query 120*b* (but not the third query 120*c*). Then, the dynamic survey generator 102 may begin again with presenting (only) the first query 120*a*, and illustrate a selection of the second response option 122*b* and resulting display of the third query 120*c* (but not the second query 120*b*). In this way, the dynamic survey generator 102 may automatically play all possible sequences (or desired/specified sequences), so that the survey designer may be assured that the resulting dynamic survey operates in an intended manner.

Thus, the dynamic survey generator 102 of FIG. 1 and similar settings allow a survey designer to design and implement dynamic surveys in a convenient and intuitive manner, using graphical techniques and manipulations that do not require programming knowledge. Accordingly, the dynamic survey generator 102 may be used by a wide range of users, having a wide range of survey design skills, so that survey responses may be obtained that are useful and complete, without over-burdening a respondent to the survey(s).

FIG. 2 is a screenshot 200, in a static design mode, of a first page of an example survey designed with the system of FIG. 1. In the example of FIG. 2, the mode selector 118 includes an indication of static mode 118a, design mode 118b, and (unselected) test mode 118c. That is, the screenshot 200 represents an initial example in which a survey designer has entered a static design mode for designing a survey. Of course, as referenced above, such operation/presentation of the mode selector 118 is merely an example, and other examples may be used; e.g., the mode selector 118 may be represented as a single drop-down menu that includes these and other options.

In FIG. 2, the survey designer has generated, selected, or otherwise obtained four queries and associated response options. Specifically, a first query 202 includes the question, "How did you like the event overall?" and response options 204 that include a rating scale in which a user is permitted to rate an enjoyment of the referenced event on a scale from 1-5, as shown.

A second query 206 includes the question, "Please let us know in more detail why you did not like the event so that we might improve it in the future?" and response option(s) 208 that include a free text entry box in which the user may type a response. A third query 210 includes the question, "What did you like best?" and response option(s) 212 that also include a free text entry box in which the user may type a response. Finally, a fourth query 214 includes the question, "Which session did you attend?" and an associated response options 216 that include the listed options of "CRM" (Customer Relationship Management), "SCM" (Supply Chain Management), and "PLM" (Product Lifecycle Management). A submit button 218 is also illustrated that may be used to allow the survey designer to designate when a design of the screenshot 200 is complete, and/or to represent a view that will ultimately be experienced by a user/respondent to a survey including the screenshot 200.

Thus, FIG. 2 illustrates that the survey designer may initially view an initial set of queries and response options. For example, the survey designer may view all potential query/response option pairs (or all such pairs for a given page or sheet of a larger survey), even though some of the query/response option pairs may be inconsistent with one another, and may not be intended to be provided together to a user. For example, in FIG. 2, the query 206 and the query 210 are designed, respectively, for a negative and positive reaction/response of a user.

Figure 3:
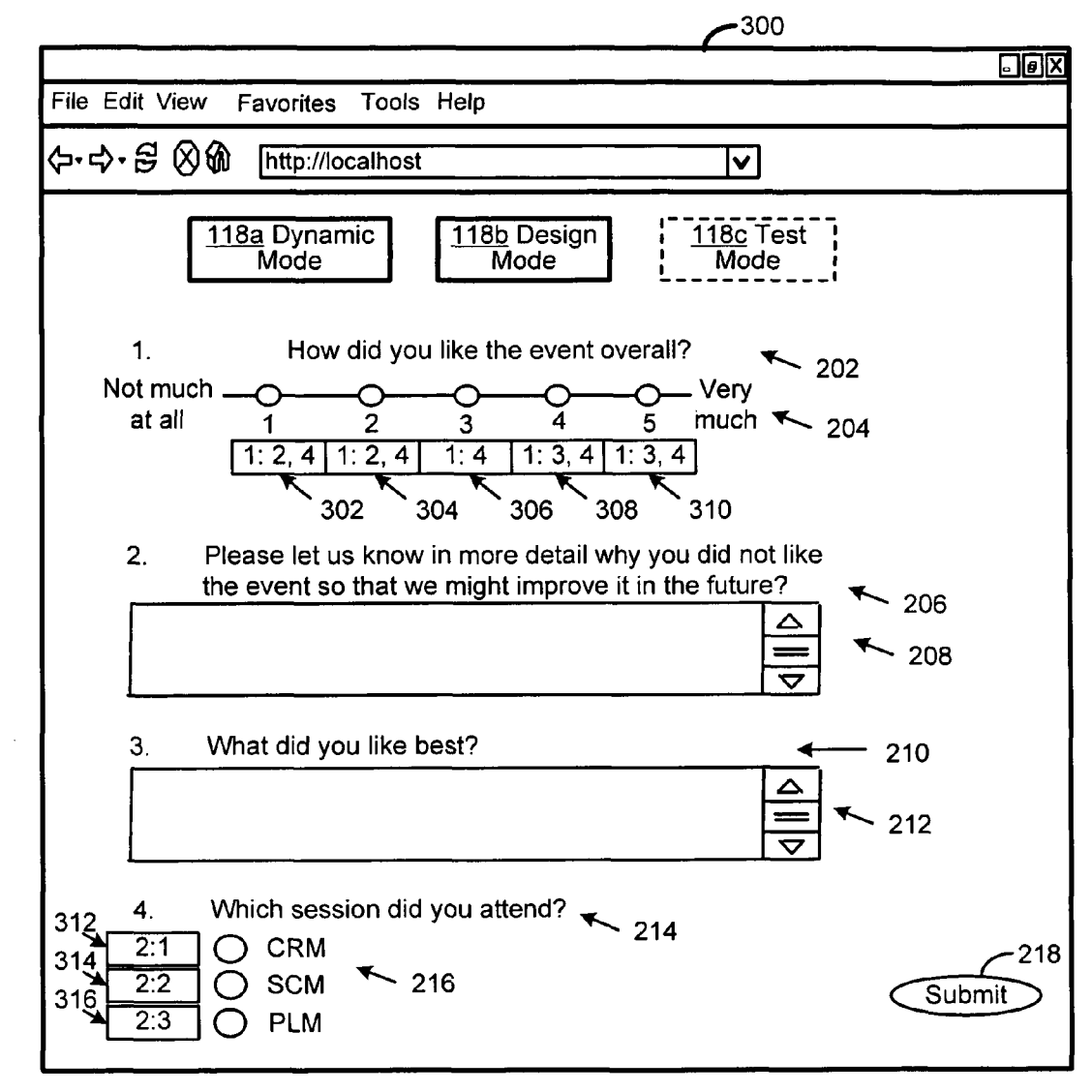

FIG. 3 is a screenshot 300, in a dynamic design mode, of the first page of the example survey of FIG. 2. That is, as reflected by the mode selector 118a, the survey designer has entered a dynamic design mode, in which the dynamic survey generator 102 presents a number of graphical sequence controllers 302-316. For example, in a case where the query/response options pair 202/204 is stored as a discrete (e.g., XML) survey element, the graphical sequence controllers 302-310 may be stored therein, or in association therewith. Then, e.g., in response to the survey designer's operation of the mode selector 118a, the dynamic survey generator 102 may cause a reload or refresh of the screen 200/300, so that the graphical sequence controllers 302-310 (and 312-316) appear to the survey designer. Example techniques for performing such operations are described in more detail below, but, generally speaking, it should be understood that provision of the graphical sequence controllers 302-316 allows for an easy, intuitive way to designate a dynamic sequence of survey questions.

Specifically, for example, the graphical sequence controller 302 is displayed in alignment with a response option "1" of the response options 204, which, as shown, corresponds to a generally negative response to the question "How did you like the event overall?" Accordingly, the graphical sequence controller 302 may be manipulated by the survey designer to designate that a subsequent query should include the query 206 (inquiring as to how the event might be improved).

In the specific example of FIG. 3, the graphical sequence controller 302 includes a designation "1:2, 4." In this example, the "1" indicates a page (i.e., the first page) of a larger electronic survey. In other words, in this case, the "1" indicates that the subsequent question will be on the same page. The colon is included as a delimiter, although of course other delimiters may be used, or a standard notation developed without need of a delimiter. The "2" in the designation indicates, as just referenced, that the subsequent query should include the query 206 (i.e., question number 2) and the "4" similarly indicates that the query 214 (i.e., question number 4) should be presented. In other words, in this example, both of the queries 206 and 214 (and associated response options 208 and 216, respectively) may be presented together upon selection of response options "1" (or "2," as described below) of response options 204.

In other words, the graphical sequence controller 302 provides the designation that "if response option 1 of the response options 204 is received, stay on the current page and proceed to queries 206 and 214 (on the same page)." In this way, a user who chooses option "1" of response options 204 is not presented with the query 210, since a question about what was enjoyed most about the event is inapplicable at best and wasteful/confusing at worst. In practice, as referenced above and as described in more detail below with respect to FIGS. 7-10, this effect may be achieved during implementation of the electronic survey by initially presenting to the user only the query/response options pair 202/204, and concealing the remainder of the screenshot 300 until one of the response options 204 (e.g., the option "1") has actually been received from the user. Then, in this example, the query/response option pairs 206/208 and 214/216 may be revealed to the user.

As should be apparent, the response option "2" of the response options 204 provides a similarly-negative response as the response option "1" of the response options 204. Thus, the graphical sequence controller 304 provides a similar designation(s) as the graphical sequence controller 302.

Conversely, the graphical sequence controllers 308, 310 are illustrated as being associated with the response options "4" and "5" of the response options 204, indicating a positive response to the question of the query 202. Accordingly, the graphical sequence controllers 308, 310 indicate that a subsequent query that should be presented if these positive response options are received includes the query 210 inquiring as to what was enjoyed about the event, as well as the more general query 214 regarding which session was attended.

The graphical sequence controller 306 is associated with the response option "3" of the response options 204, and is essentially neutral in expressing a preference. Therefore, neither the query 206 or the query 210 is presented, but, rather, the graphical sequence controller 306 designates a direct progression to the query 214.

With regard to the query 214, the graphical sequence controllers 312-316 should be understood to designate a subsequent query that should be displayed in response to selection of, respectively, the response options "CRM," "SCM," and "PLM" of the response options 216. Specifically, the graphical sequence controller 312 designates by the indication "2:1" that selection of "CRM" should result in displaying page 2, question 1 of the larger electronic survey. Similarly, selection of "SCM" is designated by the graphical sequence controller 314 to result in display of page 2, question 2, while selection of "PLM" is designated by the graphical sequence controller 316 to result in display of page 2, question 3.

Thus, the example of FIG. 3 illustrates that a user may be directed through, or provided with, a sequence of queries in which the user(s) sees only those queries that are relevant, based on previous responses, as well as those queries that are generally applicable to most or all users. Further, the user may be forwarded on to subsequent pages of an electronic survey, so that the user may complete an entire survey in a convenient, efficient manner. An example of the second page of the electronic survey of FIG. 3 is illustrated in FIG. 4.

FIG. 4 is a screenshot 400, in a dynamic design mode, of a second page of the example survey of FIGS. 2 and 3. The screenshot 400 includes a first query 402 of "How did you like the CRM session overall?" and response options 404 that include a rating scale in which a user is permitted to rate an enjoyment of the referenced event on a scale from 1-5, as in FIG. 3. Similarly, the screenshot 400 includes a second query 406 of "How did you like the SCM session overall?" and response options 408 that include a similar 5-point rating scale. The screenshot 400 also includes a third query 410 of "How did you like the PLM session overall?" and response options 412 that include the same 5-point rating scale.

A fourth query 414 asks "what is your role in the organization?" and provides response options 416 of "Manager," "Sales Expert," "and "Technical Expert," as shown. Finally in FIG. 4, a fifth query 418 allows the user to input any other feedback and provides a response option(s) 420 of a free text entry box.

Thus, referring back to FIG. 3, it should be apparent that the user's selection from among the response options 216 allow the dynamic survey generator 102, based on the graphical sequence controllers 312-316, to display an appropriate, corresponding one of the queries 402, 406, 410. For example, selection of the option "CRM" of the response options 216 instructs the dynamic survey generator 102, by way of the graphical sequence controller 312, to present the query 402 about the CRM session, while not presenting the queries 406 or 410 (since the user, in this example, did not attend either the SCM session of the query 406 or the PLM session of the query 410).

In FIG. 4, graphical sequence controllers 422, 424, and 426 are illustrated in conjunction with the response options 404, 408, and 412, respectively. In this example, all of the graphical sequence controllers 422, 424, and 426 direct the dynamic survey generator 102, and the user, to the query 414. In other words, since all of the graphical sequence controllers 422, 424, and 426 designate the query 414 on the second page 400, regardless of which response option is received, then all users will be directed back to (i.e., provided with) the query 414, no matter which session is attended or what preference therefore is expressed. Somewhat similarly, graphical sequence controllers 428 all direct the user to the query 418, regardless of which of the response options 416 is selected.

Figure 5:
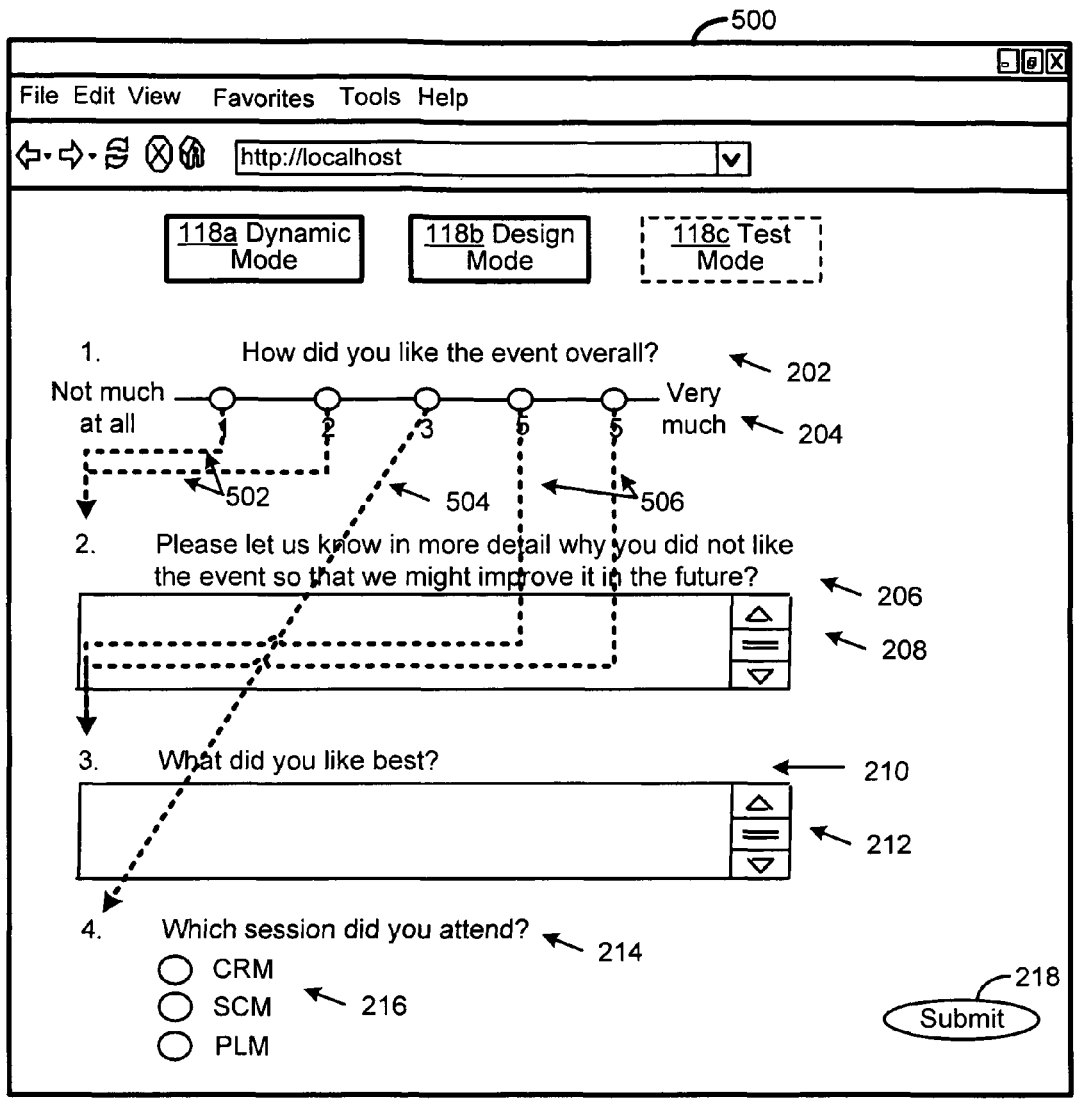
FIG. 5 is a screenshot, in an alternate dynamic design mode, of the first page of the example survey of FIG. 2.

FIG. 5 is a screenshot 500, in an alternate dynamic design mode, of the first page of the example survey of FIGS. 2 and 3. More specifically, FIG. 5 presents an alternate example of the screenshot 300 of FIG. 3, in which similar designations (e.g., a dynamic sequence of query presentation0 are made, but using different graphical sequence controllers.

Specifically, in FIG. 5, graphical sequence controllers 502, 504, and 506 are illustrated as arrows or pointers, where the survey designer may designate subsequent queries simply by pointing the graphical sequence controllers 502, 504, 506 to the desired subsequent query or queries, as shown. As just referenced, and as should be apparent, the same or similar results may be achieved as in FIG. 3 (e.g., displaying the query 206 in response to options "1" or "2" of the response options 204, as shown by the graphical sequence controller 502), and some survey designers may have a preference for a particular type of graphical sequence controller.

For example, use of the mode selector 118a to switch into dynamic mode may cause arrow ends to appear next to all response options of a page of a survey, so that the survey designer may proceed to drag/point the arrows to a desired, subsequent query. To avoid having too many arrows showing at one time, the submit button 218 may be used to store the designations of the graphical sequence controllers 502-506, which may then be concealed so that the survey designer may more easily designate subsequent queries for, e.g., the queries 206, 210, and 214. In this example, the query 202 may be changed in color or otherwise altered to indicate that its associated graphical sequence controllers 502-506 have all been assigned, so that the survey designer may focus on providing sequence designations for the following queries 206, 210, 214.

Figure 6:
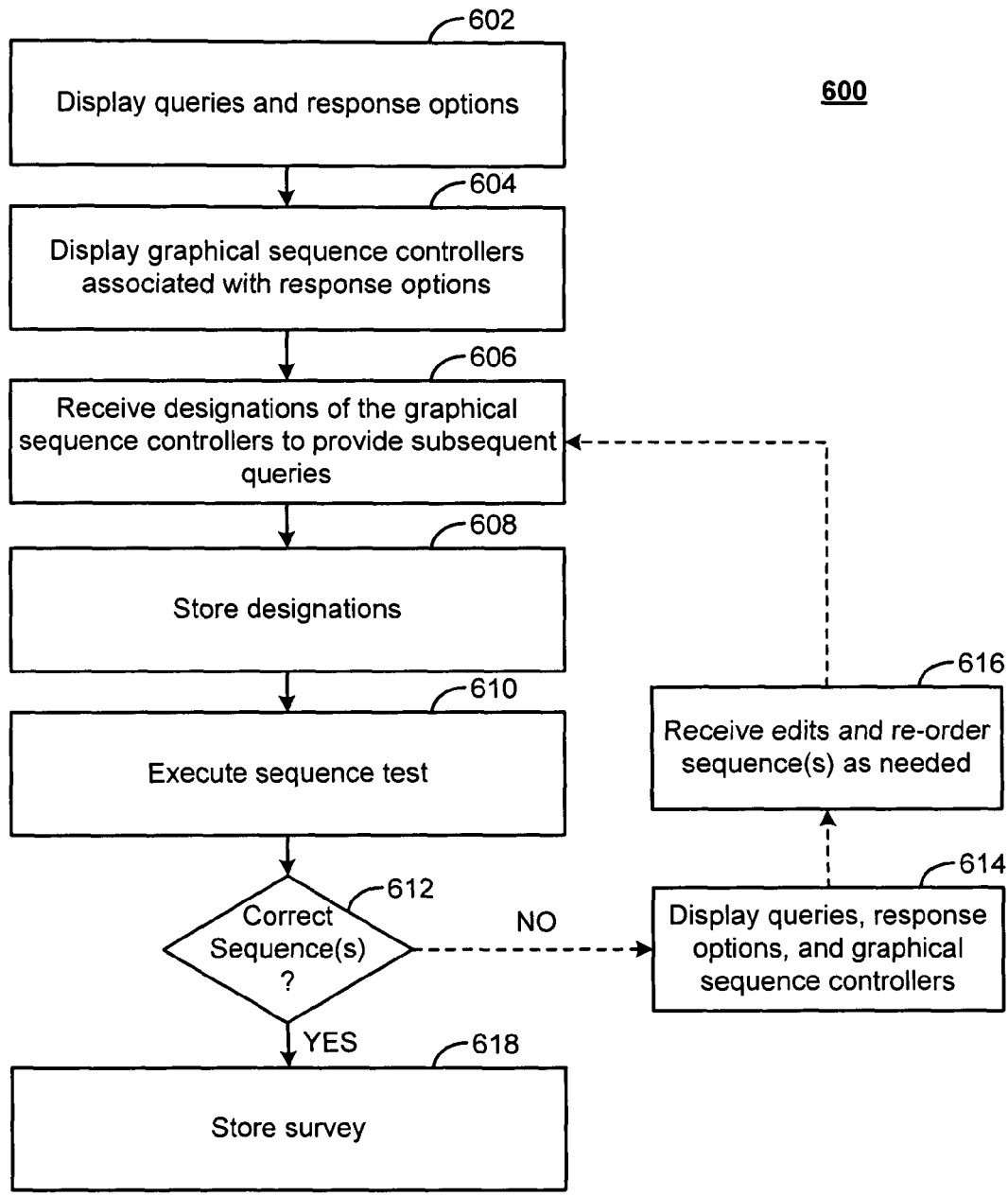
FIG. 6 is a flowchart illustrating example operations of the system of FIG. 1.

FIG. 6 is a flowchart 600 illustrating example operations of the system 100 of FIG. 1. In the example of FIG. 6, operations of the dynamic survey generator 102 may begin by displaying desired queries and response options (602). For example, the survey designer may request or design all of the possible query/response option pairs that are to be included on one or more pages of an electronic survey, including queries that may be inconsistent or may not be applicable to all users. For example, the survey designer may use the query generator 112 to generate such survey elements, and/or to access existing survey elements 110. Then, the presentation logic 114 may display the query/response pairs (e.g., one page at a time) for the use and convenience of the survey designer.

Then, graphical sequence controllers may be displayed in association with the response options (604). Further, designations of the graphical sequence controllers, providing subsequent queries to follow selection of response options for previous queries, may be received (606). Various examples of such graphical sequence controllers and designations are provided above, although it should be understood that many variations on the nature and use of such graphical sequence controllers and designations may be used.

For example, the dynamic survey generator 102 (e.g., sequence logic 116) may be configured to output the graphical sequence controllers 124a, 124b of FIG. 1 using a pop-up window(s) aligned with the first response option 122a and the second response option 122b, and the pop-up windows may include a listing of some or all remaining queries, for selection by the survey designer. For example, if the survey designer wishes to designate the second query 120b for display after selection of the first response option 122a, then the first graphical sequence controller 124a may appear as a pop-up window listing the second query 120b and the third query 120c, and the survey designer may simply click on the second query 120b within the pop-up window to provide the designation.

Further, in the various examples above, the graphical sequence controllers are all shown as being referenced to specific query numbers (e.g., question 2 or question 4 of FIG. 3). However, graphical sequence controllers also may be used to designate queries by type or topic. For example, in FIG. 1, the graphical sequence controller 124a may be used, perhaps in the pop-up window example just given, to designate subsequent queries as including "all questions related to enjoying the event." In these implementations, for example, a type or topic of a query may be stored in association with each survey element 110.

The examples of FIGS. 2-5 illustrate that a flow of queries may be designated in which users are directed through user-specific questions, and then are directed back to more generally-applicable questions. In some example implementations, such sequences may be pre-stored or pre-designated, so that when a survey designer selects a given query (e.g., the query 206 of FIGS. 2-3), one or more other queries may be suggested or required to follow (e.g., the query 214 of FIGS. 2-3).

Once received using any of the above techniques, or other techniques, the designations may be stored (608). For example, the designations may be stored within each corresponding survey element 110, as described above and shown in more detail, below, with respect to FIGS. 7-10.

A sequence test may then be executed (610). For example, the survey designer may switch to a test mode, using the mode selector 118, in order to input various response options and test to see whether desired subsequent queries are presented in response.

If the correct sequences are not provided (612), such as when a query appears out of a desired order, or is omitted entirely, then various corrective actions may be taken. For example, the queries, response options, and/or graphical sequence controllers may be (re-)displayed (614), so that the user may view and edit a current sequence and associated designations (616). Such editing may include, for example, re-designating a desired sequence, or may include re-ordering of existing queries, or an addition of a new query, or removal of an existing query. In such cases, it may be understood that previously-received designations may be affected. For example, in FIG. 3, if the query 210 is removed from the survey, then the query 214 may become question number 3 in the survey, so that the designation within the graphical sequence controllers 302 and 304 should be re-designated as "1:2, 3," while the graphical sequence controller 306 should be re-designated as "1:3." Similar comments would apply if queries were added and/or re-ordered (at any stage of the design process). For example, the sequence logic 116 of FIG. 1 may be used to execute such editing and re-ordering, e.g., by updating stored designations within appropriate ones of the survey elements 110.

If a correct sequence is displayed, then the entire survey may be stored (618), e.g., for later distribution to a desired audience of users. Examples by which surveys may be distributed and used are described in more detail, below.

Figure 7:
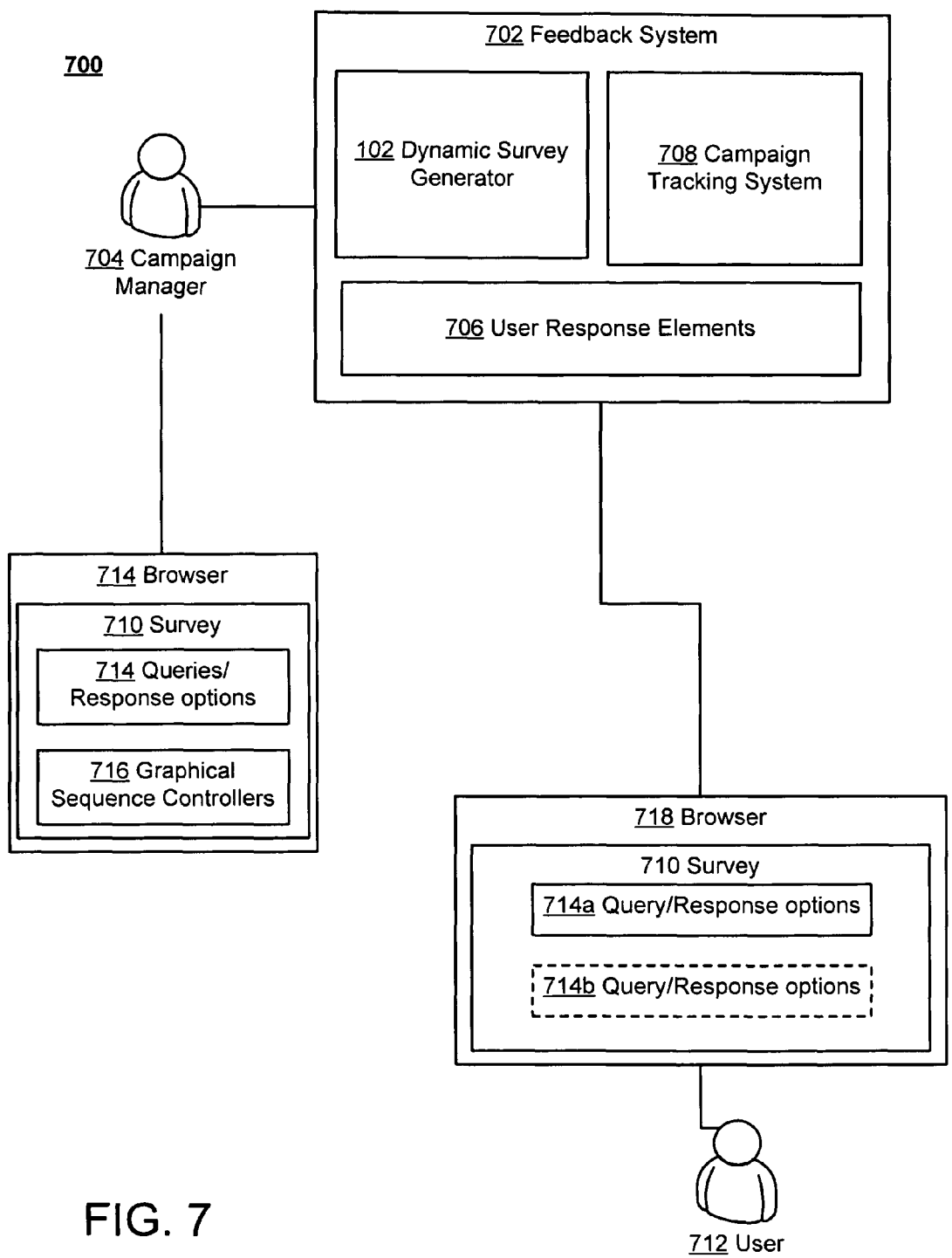
FIG. 7 is a block diagram of a system using the dynamic survey generator of FIG. 1, used with a feedback system.
Figure 8:
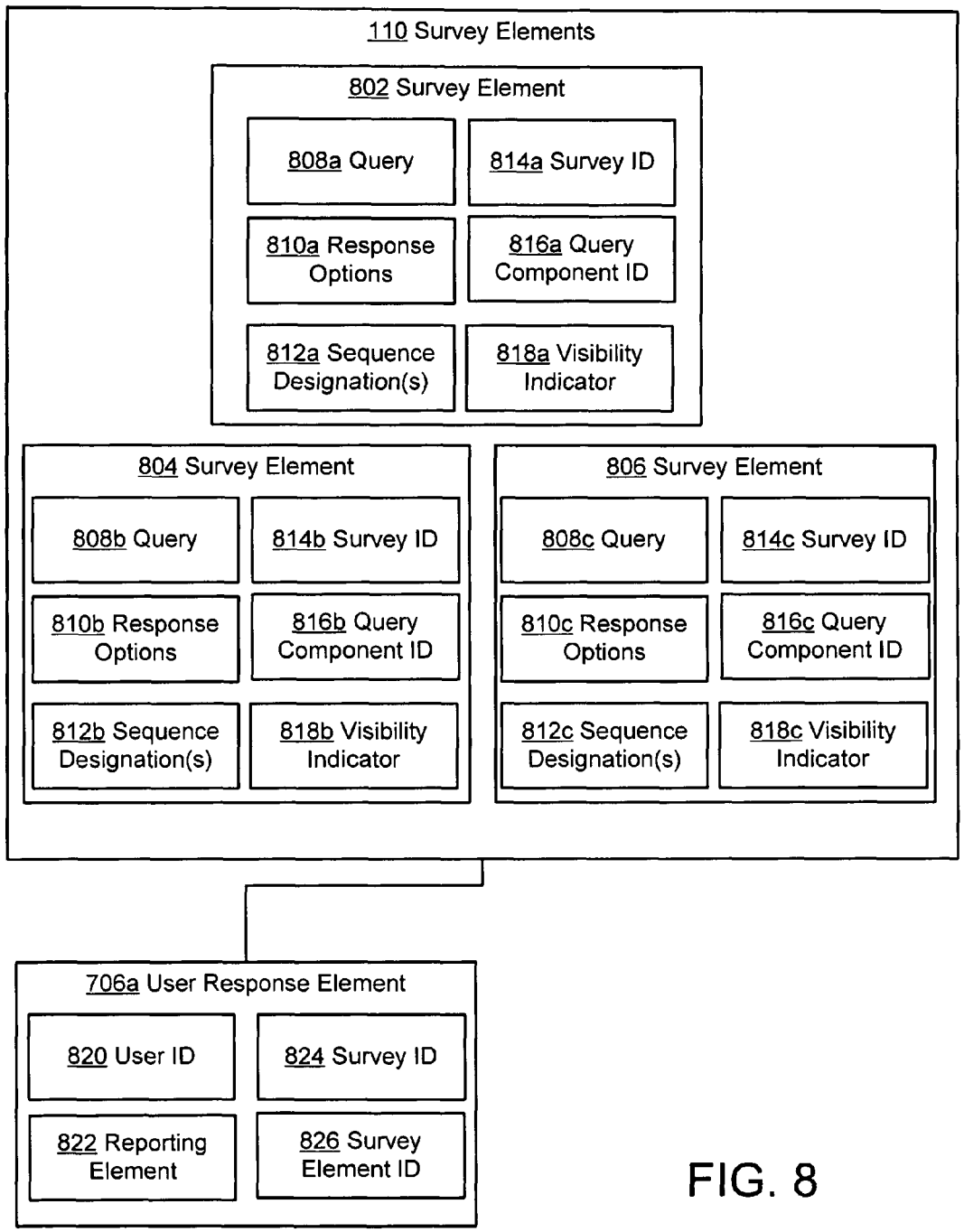
FIG. 8 is a block diagram of components used with the feedback system of FIG. 7.
Figure 9:
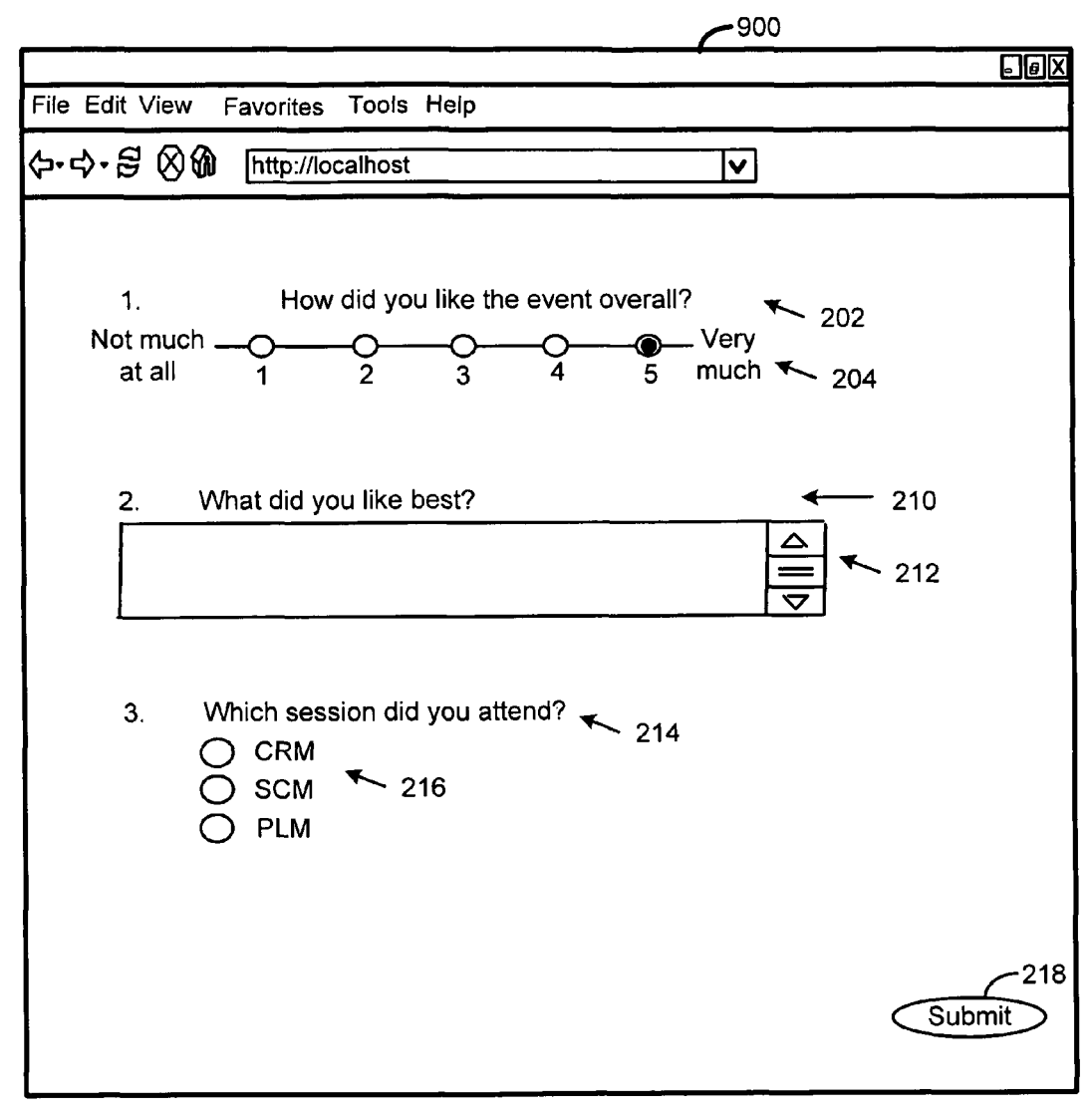
Figure 10:
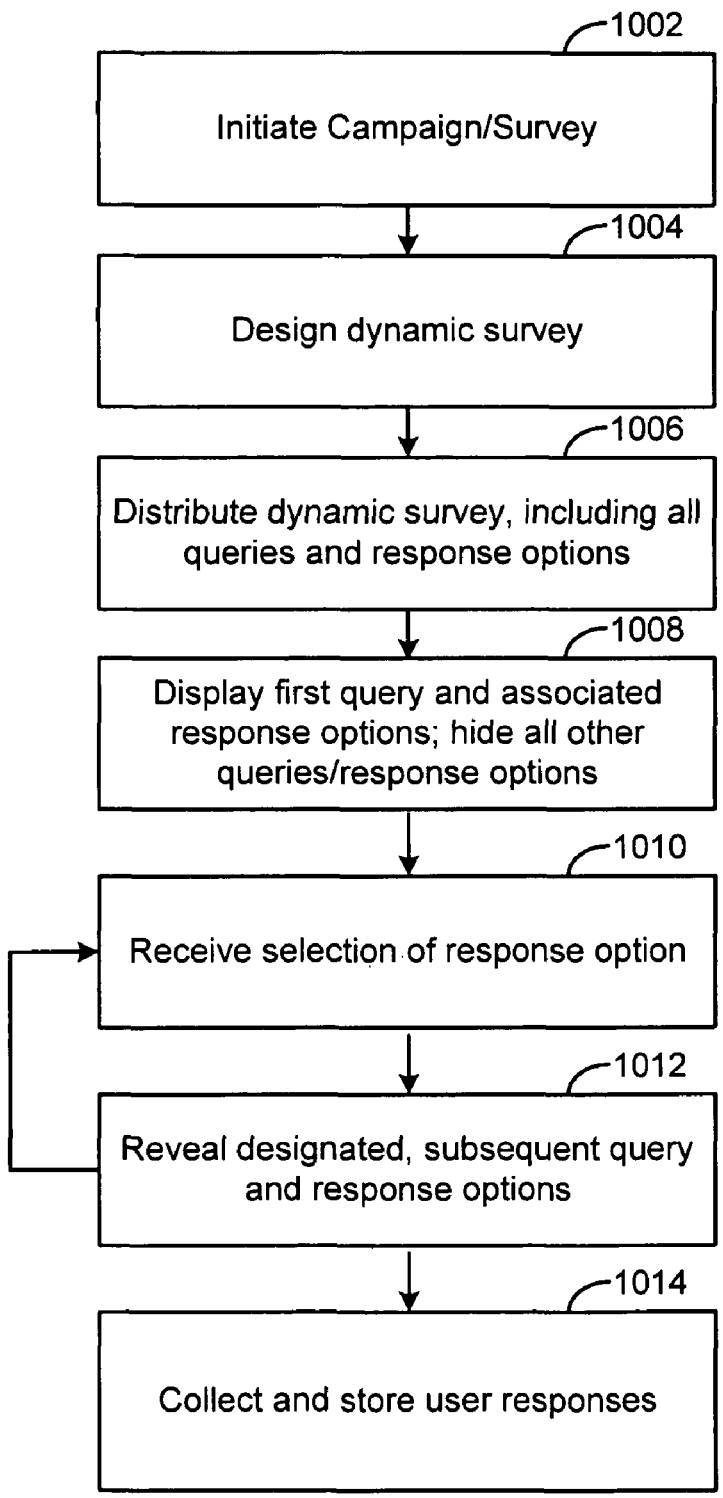
FIG. 10 is a flowchart illustrating example operations of the feedback system of FIG. 7.

FIG. 7 is a block diagram of a system 700 using the dynamic survey generator 102 of FIG. 1, used with a feedback system 702. FIGS. 8-10 are also associated with example features and operations of the system 700, as described in more detail below.

In the example of FIG. 7, and analogous to various of the examples discussed above, the feedback system 702 is available to a campaign manager 704 who wishes to create and distribute surveys, and to collect and analyze results of the surveys. As such, the feedback system 702 includes an implementation of the dynamic survey generator 102 of FIG. 1. The dynamic survey generator 102 (e.g., the query generator 112) may use various techniques to generate survey questions of various types, including, but not limited to, the various types of questions discussed above with respect to FIGS. 1-5 (e.g., questions using single-select of a plurality of responses, multi-select of a plurality of responses, single-select of a yes or no selection, single-select of a true or false selection, selection of a point on a rating scale, or a free text entry element). In this way, the campaign manager 704 may design and implement surveys that address specific needs of the campaign manager 704.

As described, the dynamic survey generator 102 may store and use survey queries as part of the survey elements 110. Specific examples of the survey elements 110 are provided below, with respect to FIG. 8. In general, though, the above description of FIGS. 1-6 should provide an appreciation that the survey elements 110 may be distributed to a plurality of users from whom the campaign manager 704 desires feedback or opinions, and such feedback or opinions may be collected in a modular, object, and/or component-based manner as user response elements 706. That is, for example, each user response to a distributed instance of the survey may be included in a user response element. As will be appreciated, a user response element associated with each user may include only those responses to queries that were actually presented to the user as part of the dynamic survey(s). Specific examples of such user response elements are provided below with respect to FIG. 8.

It should be understood that the campaign manager 704 may generate and conduct a plurality of surveys, having the same, different, or over-lapping questions, and/or having the same, different, or over-lapping users (e.g., participants/respondents). Also, more than one survey may be associated with a single campaign conducted by the campaign manager 704 (as, for example, when the campaign manager 704 sends a follow-up survey to a same set of users, in order to gauge the users' responses to product changes that have been made in the interim, perhaps based on the users' previous responses). Moreover, although only a single campaign manager 704 is illustrated in FIG. 7, there may be a plurality of campaign managers that may access the feedback system 702. Accordingly, a campaign tracking system 708 may be used in the feedback system 702 that is configured to correlate specific survey components and user response components with associated surveys. Specific examples of operations of the campaign tracking system 708 are provided in more detail below, with respect to FIGS. 8-10.

Using the feedback system 702, then, the campaign manager 704 may generate and distribute a survey 710 to a user 712, for viewing within a browser 714 or other GUI. As appreciated from the above description of FIGS. 1-6, the survey 710 may be designed as a dynamic survey, using query/response option pairs 714 and associated graphical sequence controller 716.

Thus, when the user 712 receives the survey 710, the user 712 may first be presented with a first query/response option pair 714a, while other potential query/response option pairs are concealed. Depending on a response option selected by the user 712, the dynamic survey generator 102 may then display a second query/response option pair 714b, and so on, so that the user 712 experiences a more appropriate, meaningful, and individualized version of the survey 710.

Once the user 712 has filled out the survey 710, the feedback system 702 (e.g., the campaign tracking system 708) may receive the corresponding responses for storage within the user response elements 706. For example, the user response elements 706 may include XML components that include the response information from the user 712. Although such response information may be included within the user response elements 706 in conjunction with the associated queries/responses of the relevant survey, it may be more efficient to store the response information by itself within the user response elements 706, but with a reference or link to the corresponding survey and/or campaign (e.g., with a reference or link to the corresponding survey element(s) 110).

Thus, as users, such as the user 712, respond to the survey 710, the user response elements may be correspondingly populated. When the campaign manager 704 wishes to review results of the survey 710, the campaign manager 704 may open the browser 714 or other GUI, and may access the feedback system 702 therethrough to obtain and view the survey 710 and associated results.

FIG. 8 is a block diagram of elements used with the feedback system 702 of FIG. 7. Specifically, the example of FIG. 8 includes examples of the survey elements 110 and an associated user response element 706a.

As shown, the survey elements 110 (understood to be stored, for example, within or in association with the dynamic survey generator 102) may include a plurality of survey elements 802, 804, 806. The survey element 802 is shown as including query element 808a, and associated response options 810a, along with a sequence designation(s) 812a. The survey element 802 also may include a survey ID 814a that identifies the survey 710 of which the survey element 802 is a part, and which also may specify a campaign of which the survey is a part (or such campaign information may be included separately). The survey element 802 also includes a survey element ID 816a that identifies the survey element 802. As described herein, the survey element ID 816a allows for various user responses (e.g., user response elements, such as the user response element 706) to be associated with the survey element 802. Finally in the survey element 802, a visibility indicator 818a may be used to indicate whether the survey element 802a should be visibly displayed at a given time or in a given situation, e.g., within the browser 718 of the user 712. As should be apparent from FIG. 8, similar comments to the above apply for corresponding elements 808b-818b of the survey element 804, as well as to corresponding elements 808c-818c of the survey element 806.

Also in FIG. 8, a user response element 706a is illustrated that includes a user ID 820 that identifies an associated user, e.g., a recipient/respondent of the survey 710, such as the user 712. The identification may be at a high level (e.g., identifying the user as a member of a given group or organization) or may include an actual identification of the individual in question (e.g., including a current e-mail address,). The user response element 706a may include a reporting element 822 that includes response information about which queries were viewed and/or answered by the user 712.

The user response component 706a also includes a survey ID 824 to associate the user response component 706a with the appropriate survey, as well as a survey element ID 826 to associate the user response element 706a with the appropriate survey element(s) of the related survey (e.g., the survey element 802). Of course, a campaign tracking ID, or other identifiers, also may be used.

FIG. 9 is a screenshot 900 of an implementation of a dynamic survey using the system of FIG. 7 and the example survey of FIGS. 2-3. In FIG. 9, the query 202 and response options 204 have been presented to the user 712, and the user 712 has selected option "5" of the response options 204, indicating a positive response. Accordingly, the dynamic survey generator 102 displays the queries 210/214 and response options 212/216, as shown.

As should be understood, the query 206 and response options 208 remain hidden or concealed (e.g., by way of the visibility indicator, e.g., 818a). Additionally, the query 210 has been re-numbered by the sequence logic 116 as question 2, while the query 214 has been renumbered as question 3. Thus, the user 712 experiences a seamless experience in taking the example survey, and sees only those questions that are most relevant to the user 712.

FIG. 10 is a flowchart illustrating example operations of the feedback system of FIG. 7. That is, FIG. 10 may be understood to operate in the context of the browser 718 of FIG. 7, using the feedback system 702 and the dynamic survey generator 102.

More specifically, FIG. 10 assumes that the system 700 operates using one or more types of client-side, remote scripting techniques for the asynchronous loading of elements/components to the browser 718, without requiring a full reload of a page (e.g., of the survey 710) currently being displayed within the browser 718. In this way, the user 712 may be provided with the described dynamic survey experience(s), e.g., the experience just described with respect to FIG. 9.

For example, in FIG. 10, a campaign and/or associated survey is/are initiated (1002). For example, the campaign manager 704 may provide a name, scope, audience, distribution method(s), and other characteristics of a particular campaign, using, e.g., the campaign tracking system 708.

A dynamic survey may be designed (1004), e.g., using the techniques described herein, such as the operations of FIG. 6. Then, the dynamic survey may be distributed, including all possible queries and response options associated therewith (1006). For example, the user 712 may receive the survey 710 by way of e-mail, or may visit a URL to access the survey using the browser 718.

Once the user has accessed the survey 710, a first query and associated response options may be displayed, while all other queries/response options are hidden (1008). For example, the presentation logic 114 of the dynamic survey generator 102 may use the visibility indicator(s) 818a-818c to make the first query/response options visible, while concealing the remaining queries/response options. Of course, it should be understood that more than a single query/response options pair may be presented initially, such as when the first two or more queries are not associated with any sequence designations (other than possibly a permanent designation of a consecutively-following query). In such cases, all queries/response pairs up to the first out-of-order designation may initially be displayed.

A selection of a response option of the initially-presented response options may then be received (1010), and a designated, subsequent query/response options may be revealed (1012). For example, the presentation logic 114 and/or sequence logic 116 of the dynamic survey generator 102 may receive a selected response option and check a sequence designation of an associated survey element, e.g., the sequence designation 812a, to determine a subsequent query (component) to be presented, e.g., the survey element 806. Then, the presentation logic 114 may change a visibility indicator 818c of the survey element 806 to "visible." As should be understood, more than one query/response options pair may be made visible at once. For example, in FIG. 9, the queries/response options 210/212 and 214/216 may be revealed together, since they may be designated as such.

The cycle of receiving selected response options and revealing subsequent queries may continue until a final query is reached, at which point the user responses may be collected and stored (1014). For example, the user response element 706a may be stored within user response elements 706.

It should be understood that a number of techniques exist for implementing the example embodiments described herein. For example, as referenced above, various asynchronous, remote scripting techniques may be used to provide and implement the graphical sequence controllers during design of the dynamic survey (e.g., FIG. 6), and/or to display/conceal appropriate query/response options pair(s) during the execution of the dynamic survey (e.g., FIG. 10).

For example, during design of the dynamic surveys described herein, the browser 714 may be associated with a local memory, and when the campaign manager 704 initiates design of a dynamic survey, the dynamic survey generator 102 may asynchronously load the desired survey elements 110 to the local memory. In these examples, a type of graphical sequence controller may be associated with all of the loaded survey elements as a whole, or with each of the survey elements 110 individually, or a different type of graphical sequence controller may be associated with each of the survey elements 110. For example, in the survey element 802, information about a presentation and implementation of a corresponding graphical sequence controller may be stored, e.g., in association with the ultimately-received sequence designation(s) 812(*a*).

When, for example, the designer uses the mode selector 118 to switch into a dynamic design mode, the browser 714 may display the associated graphical sequence controllers, as described above, by loading the graphical sequence controllers from the local memory. Then, the received sequence designations may be stored (e.g., the sequence designation(s) 812(*a*).

Since the survey elements 110 may be loaded asynchronously and operated locally to the browser 714, the campaign manager 704 may be provided with a fast, convenient experience in designing the dynamic survey, even though the campaign manager 704 may not have installed any relevant software to a local machine running the browser 714 (e.g., the campaign manager 704 may access the survey elements 110 over the Internet, or over a corporate Intranet).

Somewhat analogously, the user 712 may be provided with a fast, convenient experience in taking the survey 710. For example, the browser 718 also may have a local memory and may load all of the survey elements 110, e.g., in response to a request of the user 712. Again, the survey elements 110 may be loaded asynchronously, so that the user 712 does not have to wait for all relevant survey elements 110 to be loaded before experiencing the survey 710.

Thus, the above-described effects may be achieved; for example, the browser 718 may locally determine the sequence designation(s) 812*a* of the survey element 802 in response to the selection of the user 712, and activate the appropriate visibility indicator of the subsequent survey element activated (e.g., may activate the visibility indicator 818*b* of the survey element 804).

In example techniques, the survey elements 110 (and/or the user response elements 706) may be implemented in conjunction with Macromedia Flash™, which provides an integrated development environment (IDE) for authoring content (e.g., using the browser 714) in a proprietary scripting language known as ActionScript. The content may then be provided using, for example, the associated Macromedia Flash Player within the browser 718.

Of course, other techniques may be used to asynchronously load and implement the survey elements 110 to local memory of the browsers 714 and/or 718. For example, client-side scripting languages, such as, for example, Javascript, may be used to load and implement the survey elements 110, e.g., to modify a document object model (DOM) of an already-loaded page of the browser(s) 714/718 and store the sequence designations and/or present (reveal for display) a subsequent query based on a selected response to previous query. These and similar techniques may be used in conjunction with interactive web development techniques such as, for example, "Asynchronous JavaScript And XML," also referred to as Ajax. Ajax may be used to allow for interacting with a server (e.g., a server running the feedback system 702) while a current web page is loading (or has loaded). Ajax may use the XMLHttpRequest or an IFrame object to exchange data with an associated server, usually in the XML format (although other formats may be used).

Still other additional or alternative techniques may be used to operate the dynamic survey generator 102 as described herein. For example, Dynamic Hyper-Text Mark-up Language (DHTML) techniques, ActiveX techniques, Java applets, and/or other remote/client-side scripting techniques may be used.

Other techniques also may be used. For example, new query/response option pairs may be provided by forcing or requiring a refresh of an entire page (e.g., refreshing the screenshot 200 of FIG. 2 to obtain the screenshot 300 of FIG. 3, or refreshing the screenshot 900 of FIG. 9 to obtain subsequent queries, such as the queries 210 and 214).

Although the above examples have been provided for the sake of explanation, it should be understood that many other embodiments may be implemented. For example, in the case of FIG. 3, a user may be allowed to select multiple ones of the response options 216, instead of just one, and may therefore be presented with multiple ones of the queries 402, 406, 410 of FIG. 4. Also, although the above graphical sequence controllers were shown in association with response options such as single-select or multi-select, other examples are possible. For example, in a free-text entry response option, the dynamic survey generator 102 may do a word search for key words that may trigger a designation of a subsequent query.

Also, although the various graphical sequence controllers described herein are illustrated as designating consecutively-following queries within an original, complete sequence of queries, it should be understood that designations may be made that specify queries that are earlier within a sequence, or that are in a separate survey altogether. Thus, the term "subsequent query" (or similar terms) should be understood to include, for example, any query that is subsequent in time to a previous query for which at least a partial response has been received, with respect to the dynamic survey being designed/conducted. Still further, the described examples discuss situations in which there is a one-to-one or one-to-many correspondence between a previous or source query/response option pair and a subsequent query (and associated response options). However, there also may be other examples, including many-to-one examples, or many-to-many. For example, graphical sequence controllers may be used to specify that a subsequent query should be presented based on (responses to) multiple previous queries, e.g., based on a combination of received responses.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer program product for creating an electronic survey, the computer program product being tangibly embodied on a computer-readable storage medium and being configured to cause a data processing apparatus to:

display, using a graphical user interface, a first query, a second query, and a third query, the first query being associated with a first response option and a second response option;

display a first graphical sequence controller associated with the first response option within the graphical user interface, and a second graphical sequence controller associated with the second response option within the graphical user interface;

receive a first graphical association from a user of the computer program product, the first graphical association having a first designation of the first graphical sequence controller, the first designation including an indication that the second query is to be provided in response to selection of the first response option;

receive a second graphical association from the user of the computer program product, the second graphical association having a second designation of the second graphical sequence controller, the second designation including an indication that the third query is to be provided in response to selection of the second response option; and store the first designation, the second designation, the first query, the second query, and the third query as being included within the electronic survey for use in execution thereof.

2. The computer program product of claim 1, wherein the first graphical sequence controller and the second graphical sequence controller are displayed in alignment with the first response option and the second response option, respectively.

3. The computer program product of claim 1, wherein the first graphical sequence controller and the second graphical sequence controller include editable text-entry boxes in which the second query and the third query, respectively, are designated.

4. The computer program product of claim 1, wherein the first graphical sequence controller and the second graphical sequence controller include arrows pointed, respectively, from the first response option to the second query and from the second response option to the third query.

5. The computer program product of claim 1, wherein the second query and third query are stored in association with instructions to be concealed until a selection is received of the first response option or the second response option, respectively.

6. The computer program product of claim 1, wherein the first query, the first response option, the second response option, the first designation and the second designation are stored together as a discrete survey element.

7. The computer program product of claim 1, wherein the computer program product is configured to cause the data processing apparatus to:

receive a changed order of one or more of the first query, second query, and third query; and update the first graphical sequence controller, second graphical sequence controller, first designation, and second designation, based on the changed order.

8. The computer program product of claim 1, wherein the computer program product is configured to cause the data processing apparatus to:

provide a suggestion regarding use of the first graphical sequence controller.

9. The computer program product of claim 1, wherein the first designation designates the second query based on a topic or type of the second query.

10. The computer program product of claim 1, wherein the first designation designates the second query as being on a subsequent page of the electronic survey.

11. The computer program product of claim 1, wherein the first designation designates the second query and at least a fourth query of the electronic survey as being provided in response to the first response option.

12. The computer program product of claim 1, wherein the first query, second query and/or the third query include question types having a format of one or more of: single-select of a plurality of responses, multi-select of a plurality of responses, single-select of a yes or no selection, single-select of a true or false selection, or selection of a point on a rating scale, or a free text entry element.

13. A system for creating an electronic survey, the system including instructions recorded on a computer-readable storage medium and comprising:

presentation logic configured to display a plurality of queries within a graphical user interface, each query being associated with a plurality of response options; and sequence logic configured to display, within the graphical user interface and in conjunction with the plurality of queries and the associated plurality of response options, a graphical sequence controller in association with each of the plurality of response options, and to receive from a user of the system a graphical manipulation of the graphical sequence controllers by which a sequence is graphically designated for presenting a subsequent query during a later execution of the electronic survey being created, to be based on a selected response option of a previous query during the execution, wherein the designated sequence is visually displayed within the graphical user interface.

14. The system of claim 13 comprising a query generator configured to generate and/or access a plurality of survey elements that include the plurality of queries and associated response options.

15. The system of claim 13 wherein the presentation logic is configured to present a mode selector configured to present a design mode for designing a dynamic survey to include the queries and response options, and a test mode for testing the designed dynamic survey.

16. The system of claim 13 wherein the sequence logic is configured to store a discrete component that includes a query, associated response options, and one or more designations of subsequent queries as determined from the graphical manipulation of one or more of the graphical sequence controllers.

* * * * *